United States Patent Office 3,177,201
Patented Apr. 6, 1965

3,177,201
SUBSTITUTED 5-PHENYL-3H-1,4-BENZODIAZ-
EPINES AND HYDROGENATION PRODUCTS
THEREOF
Earl Reeder, Nutley, and Leo Henryk Sternbach, Upper
Montclair, N.J., assignors to Hoffmann-La Roche Inc.,
Nutley, N.J., a corporation of New Jersey
No Drawing. Filed Dec. 10, 1959, Ser. No. 858,598
6 Claims. (Cl. 260—239)

This invention relates to substituted 5-phenyl-3H-1,4-benzodiazepines and substituted 5-phenyl-4,5-dihydro-3H-1,4-benzodiazepines. The benzodiazepines of this invention may be illustrated by the following structural formulas:

(I)
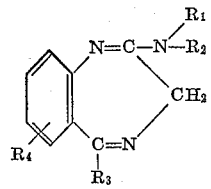

(II)
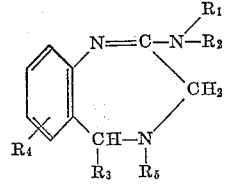

Preferred are 2-(N-$R_1,R_2$)-5-$R_3$-7-$R_4$-3H-1,4-benzodiazepines, 2-(N-$R_1,R_2$)-5-$R_3$-7-$R_4$ - 4,5 - dihydro-3H-1,4-benzodiazepines and 2-(N-$R_1,R_2$)-4-hydroxy-5-$R_3$-7-$R_4$-4,5-dihydro-3H-1,4-benzodiazepines.

As used above, $R_1$ represents hydrogen and lower alkyl, $R_2$ represents hydrogen and lower alkanoyl, $R_3$ represents phenyl, halophenyl and lower alkylphenyl, $R_4$ represents hydrogen, halogen and lower alkyl and $R_5$ represents hydrogen, hydroxy and lower alkanoyloxy. The lower alkyl groups in each instance refer to such straight chain and branched chain aliphatic hydrocarbon radicals as methyl, ethyl, propyl, isopropyl, butyl, isobutyl, amyl, hexyl and the like. The lower alkanoyl groups are those derived from lower fatty (alkanoic) acids, e.g. acetic, propionic, butyric, valeric acids, etc. Chlorine and bromine are preferred among the halogens in both benzene rings.

The compounds of this invention may be obtained by several different routes. A substituted 3H-1,4-benzodiazepine 4-oxide, such as 7 - chloro-2-methylamino-5-phenyl - 3H - 1,4 - benzodiazepine 4 - oxide or 2-amino-7-chloro-5-phenyl-3H-1,4-benzodiazepine 4-oxide, may be heated with phosporus trichloride in an inert solvent or hydrogenated in the presence of Raney nickel catalyst to obtain the correspondingly substituted 3H-1,4-benzodiazepine. Alternatively a substituted 3H-1,4-benzodiazine 4-oxide, such as 7-chloro-2-methylamino-5-phenyl-3H-1,4-benzodiazepine 4-oxide, may by hydrogenated in the presence of palladium catalyst to obtain a 3H-1,4-benzodiazepine such as 2 - methylamino-5-phenyl-4,5-dihydro-3H-1,4-benzodiazepine. The same compound may be hydrogenated in the presence of platinum oxide catalyst to obtain 7-chloro-2-methylamino-5-pehnyl-4,5-dihydro-3H-1,4-benzodiazepine or reduced with an alkali metal aluminum hydride, e.g. lithium aluminum hydride, to obtain 7 - chloro - 4-hydroxy-2-methylamino-5-phenyl-4,5-dihydro-3H-1,4-benzodiazepine.

As a further alternative, a compound such as the last named 7 - chloro-4-hydroxy-2-methylamino-5-phenyl-4,5-dihydro-3H-1,4-benzodiazepine may be made to react with thionyl chloride in an inert solvent such as chloroform to obtain the aforementioned 7-chloro-2-methylamino-5-phenyl-3H-1,4-benzodiazepine. The latter can then be hydrogenated in the presence of platinum oxide catalyst to obtain 7-chloro-2-methylamino-5-phenyl-4,5-dihydro-3H-1,4-benzodiazepine, also referred to above.

Any of the above-named compounds will react with an acyl halide or acid anhydride such as acetyl chloride, propionyl chloride, acetic anhydride or propionic anhydride in a tertiary base like pyridine to introduce an acyl group on the nitrogen in the 2-position and also in the 4-position in compounds wherein $R_5$ represents hydrogen or hydroxy.

The compounds of this invention which are basic in character, i.e. the compounds represented by formulas I and II except when $R_2$ represents lower alkanoyl, form acid addition salts by reaction with acids such as mineral acids, e.g. hydrohalic acids such as hydrochloric acid, hydrobromic acid and the like, nitric acid, sulfuric acid, phosphoric acid, etc. The acid addition salts formed by the compounds described above are also within the scope of this invention.

The novel compounds answering to Formulas I and II, as well as their medicinally acceptable acid addition salts, are useful as sedatives, muscle relaxants or onticonvulsants. The bases or salts may be administered orally and the soluble salts may be administered parenterally by incorporating therapeutic dosages of the free base or salt in conventional dosage forms such as injectables, elixirs, suspensions, capsules, powders, tablets of the like, according to accepted pharmaceutical practice. The compounds of this invention also may be used as intermediates for the production of compounds described in our copending application Serial No. 858,564, filed concurrently, and now abandoned.

The following examples provide compounds which are illustrative of the invention as well as the methods for synthesizing such novel compounds. The temperatures are stated on the centigrade scale and melting points are all corrected.

Example 1

A mixture of 20 g. of 7-chloro-2-methylamino-5-phenyl-3H-1,4-benzodiazepine 4-oxide, 300 ml. of chloroform and 38 ml. of phosphorus trichloride was refluxed for one hour, then concentrated in vacuo to dryness. To the residue methylene chloride, an excess of 50% potassium hydroxide and ice were added. The mixture was stirred energetically to achieve complete neutralization and the precipitated reaction product was filtered off. The methylene chloride solution was then separated from the aqueous layer, dried with sodium sulfate, filtered and concentrated in vacuo to obtain an additional quantity of the crude product. The crude fractions were combined and crystallized from acetone to obtain rhombic, yellow plates of 7 - chloro-2-methylamino-5-phenyl-3H-benzodiazepine, M.P. 240–241°.

Example 2

A solution of 15 g. of 7-chloro-2-methylamino-5-phenyl-3H-1,4-benzodiazepine 4-oxide in 200 ml. of warm dioxane was cooled to room temperature and then hydrogenated at atmospheric pressure in the presence of 20 g. of Raney nickel. After 2 hours, one mol of hydrogen was absorbed and the reaction came to almost a complete stop. The precipitated hydrogenation product was dissolved by heating and the Raney nickel was filtered off. The product, 7 - chloro-2-methylamino-5-phenyl-3H-1,4-benzodiazepine, was isolated by crystallization from acetone, M.P. 240–241°.

A methanol suspension of the base obtained above was reacted with an equimolar amount of 1 N methanolic hydrochloric acid. The product, 7-chloro-2-methylamino-5-phenyl-3H-1,4-benzodiazepine hydrochloride, was crystallized by the addition of ether and petroleum ether, M.P. 260–261°.

Example 3

2 g. of 7-chloro-2-methylamino-5-phenyl-3H-1,4-benzodiazepine were dissolved with slight heating in a mixture of 10 ml. of acetic anhydride and 20 ml. of pyridine. The solution was left at room temperature for 16 hours and concentrated in vacuo. The residue, 7-chloro-2-(N-methylacetamido) - 5 - phenyl - 3H - 1,4 - benzodiazepine, was crystallized from a mixture of ether and petroleum ether, M.P. 162°.

Example 4

A solution of 2.83 g. (10 mmol.) of 7-chloro-2-methylamino-5-phenyl-3H-1,4-benzodiazepine in 20 ml. of acetic acid was hydrogenated at room temperature and atmospheric pressure in the presence of 0.3 g. of prehydrogenated platinum oxide. After one hour, 10 mmol. of hydrogen were absorbed and the absorption of hydrogen slowed down considerably. The catalyst was filtered off and the solution was concentrated in vacuo. The residue was dissolved in ether and washed with ice cold 3 N sodium hydroxide. The ether solution was dried, concentrated in vacuo, and the residue was crystallized from a mixture of ether and petroleum ether yielding colorless crystalline 7-chloro-2-methylamino-5-phenyl-4,5-dihydro-3H-1,4-benzodiazepine, softening at 176° and melting at 179–180°.

Example 5

A solution of 2.99 g. (10 mmol.) of 7-chloro-2-methylamino-5-phenyl-3H-1,4-benzodiazepine 4-oxide in 40 ml. of acetic acid was added to 0.3 g. of prehydrogenated platinum oxide. The compound was hydrogenated at room temperature and atmospheric pressure for 1.5 hours until 20 mmol. of hydrogen were absorbed and the reaction came to a complete stop. The solution was filtered, the filtrate was concentrated in vacuo and the residue was dissolved in ether. The ether solution was washed with sodium hydroxide, dried, and concentrated in vacuo. The residue was neutralized with 20 mmol. of 1 N methanolic hydrochloric acid. The solution was concentrated in vacuo and the residue was crystallized and recrystallized from a mixture of methanol and ether. The product, 7-chloro-2-methylamino-5-phenyl-4,5-dihydro-3H-1,4-benzodiazepine dihydrochloride, was again recrystallized from dilute hydrochloric acid, M.P. 236–238°.

The dihydrochloride was converted into the free base by treatment with sodium hydroxide.

Example 6

6 g. (20 mmol.) of 7-chloro-2-methylamino-5-phenyl-3H-1,4-benzodiazepine 4-oxide in 200 ml. of methanol were hydrogenated at room temperature and atmospheric pressure in the presence of 2 g. of 10% palladium-on-charcoal catalyst. After 3½ hours, about 50 mm. of hydrogen were absorbed. The reaction was stopped, the solution was filtered, the filtrate was concentrated in vacuo and the residue was crystallized from a mixture of alcohol, ether and petroleum ether. The pure 2-methylamino-5-phenyl-4,5-dihydro-3H-1,4-benzodiazepine crystallized as the hydrochloride, forming colorless plates melting at 240–242°.

The base, 2-methylamino-5-phenyl-4,5-dihydro-3H-1,4-benzodiazepine, was liberated from the hydrochloride obtained above by treatment with sodium hydroxide and, after crystallization from a mixture of ether and petroleum ether, formed long prisms melting at 153–155°.

The free base obtained above was dissolved in 2 mols of 1 N methanolic hydrogen chloride. The solution was concentrated in vacuo and the 2-methylamino-5-phenyl-4,5-dihydro-3H-1,4-benzodiazepine dihydrochloride was crystallized from a mixture of methanol, ether and petroleum ether, M.P. 240–242°.

Example 7

A solution of 20 g. of 7-choloro-2-methylamino-5-phenyl-3H-1,4-benzodiazepine 4-oxide in 200 ml. of dry tetrahydrofuran was added at room temperature in portions to a stirred suspension of 3.8 g. of lithium aluminum hydride in 250 ml. of tetrahydrofuran. The mixture was refluxed for 30 minutes, then the excess of lithium aluminum hydride was destroyed by the addition of ethyl acetate. Ice water was added and the reaction product was extracted with ether. The ether solution was dried and concentrated in vacuo. The residue was crystallized from ether and recrystallized from acetone to obtain 7-chloro-2-methylamino - 4 - hydroxy-5-phenyl-4,5-dihydro-3H-1,4-benzodiazepine in the form of colorless needles melting at 183–184°.

A solution of the base obtained above in an excess of 1 N methanolic hydrogen chloride was concentrated in vacuo to a small volume and diluted with ether. 7-chloro-2-methylamino - 4-hydroxy-5-phenyl-4,5 - dihydro-3H-1,4-benzodiazepine dihydrochloride precipitated and was recrystallized from a mixture of methanol and ether in the form of yellowish needles melting at 166–170°, with dec.

Example 8

A solution of 1.3 g. of 7-chloro-2-methylamino-4-hydroxy-5-phenyl-4,5-dihydro-3H-1,4-benzodiazepine in 30 ml. of acetic anhydride was left at room temperature for 16 hours, then concentrated in vacuo to dryness. The residue was crystallized from a mixture of ether and petroleum ether. The product, 7-chloro-2-(N-methylacetamido)-4-acetoxy-5-phenyl - 4,5-dihydro-3H,1,4 - benzodiazepine, melted at 133–134°.

Example 9

0.5 ml. of thionyl chloride was added to a warm solution of 0.5 g. of 7-chloro-2-methylamino-4-hydroxy-5-phenyl-4,5-dihydro-3H-1,4-benzodiazepine in 25 ml. of chloroform. The mixture was refluxed for 10 minutes, poured on ice and neutralized with 3 N sodium hydroxide. The organic layer was separated, dried and concentrated in vacuo. The residue was crystallized from acetone to obtain 7-chloro-2-methylamino-5-phenyl-3H-1,4-benzodiazepine, the same compound as in Example 1.

Example 10

A suspension of 25 g. of 6-bromo-2-chloromethyl-4-phenyl-quinazoline 3-oxide in 100 ml. of a 30% solution of ethylamine in ethanol was stirred for 16 hours. The precipitated reaction product, 7-bromo-2-ethylamino-5-phenyl-3H-1,4-benzodiazepine 4-oxide, was filtered off and crystallized from acetone, M.P. 246–248°.

A mixture of 10 g. of 7-bromo-2-ethylamino-5-phenyl-3H-1,4-benzodiazepine 4-oxide, 250 ml. of chloroform and 10 ml. of phosphorus trichloride was refluxed for one hour. To the solution methylene chloride, an excess of 50% potassium hydroxide and ice were added. The mixture was stirred energetically to achieve complete neutralization. The methylene chloride solution was then separated, dried with sodium sulfate, filtered and concentrated in vacuo. The residue crystallized upon the addition of ether. After recrystallization from a mixture of methanol and acetone, the product, 7-bromo-2-ethylamino - 5 - phenyl-3H-1,4-benzodiazepine, formed yellow prisms melting at 224°.

Example 11

A mixture of 10 g. of 7-methyl-2-methylamino-5-phenyl-3H-1,4-benzodiazepine 4-oxide, 250 ml. of chloroform and 10 ml. of phosphorus trichloride was refluxed for one hour and then concentrated in vacuo to dryness. To the residue methylene chloride, an excess of 50% potassium hydroxide and ice were added. The mixture was stirred energetically to achieve complete neutralization. The methylene chloride solution was then separated, dried with sodium sulfate, filtered and the filtrate was concentrated in vacuo. The residue was crystallized by the addition of ether. After recrystallization from a mixture of methylene chloride and ether, the product, 7-methyl-2-methylamino-5-phenyl-3H - 1,4 - benzodiazepine, formed colorless rhombic plates melting at 219°.

*Example 12*

A mixture of 5 g. of 7-chloro-2-amino-5-phenyl-3H-1,4-benzodiazepine 4-oxide, 150 ml. of chloroform and 5 ml. of phosphorus trichloride was refluxed for one hour. Methylene chloride, an excess of 50% potassium hydroxide and ice were added. The mixture was stirred energetically to achieve complete neutralization and the precipitated reaction product was then filtered off. The methylene chloride solution was separated, dried with sodium sulfate, filtered and concentrated in vacuo to yield an additional amount of the product. After recrystallization from methanol, the 7-chloro-2-amino-5-phenyl-3H-1,4-benzodiazepine formed colorless prisms melting at 234–235°.

*Example 13*

To 500 g. of molten p-chloraniline heated to 120° were added with stirring 750 ml. of p-chlorobenzoyl chloride, causing a violent evolution of hydrogen chloride. The mixture solidified and was molten by heating to 200°. At this temperature, 500 g. of anhydrous zinc chloride were introduced. The stirring was continued and the mixture was heated at 230–242° for 2 hours. It was then poured into one liter of 0.5 N hydrochloric acid. The precipitated solid was filtered off, pulverized, suspended in one liter of 0.5 N hydrochloric acid and refluxed for one hour. The mixture was then cooled. The resinous material was filtered off and dissolved in a mixture of 14 liters of acetic acid and 3 liters of concentrated hydrochloric acid. The solution was refluxed for 18 hours and concentrated in vacuo. The residue was dissolved in 4 liters of benzene and stirred with an excess of alkali. The precipitated sodium p-chlorobenzoate was filtered off and the aqueous layer was discarded. The benzene layer was washed with 2 N sodium hydroxide and then with an excess of 2 N hydrochloric acid. The benzene layer was dried and concentrated to obtain the crude product. The 2-amino-5,4'-dichlorobenzophenone was crystallized from alcohol to obtain yellow needles melting at 118–119°.

A solution of 169 g. of 2-amino-5,4'-dichlorobenzophenone and 73 g. of hydroxylamine hydrochloride in 730 ml. of alcohol was refluxed for 16 hours. The solution was concentrated in vacuo. The residue was diluted with water and ether and neutralized with 40% sodium hydroxide. The ether layer was separated, dried with sodium sulfate and concentrated in vacuo. The residue was dissolved in 100 ml. of benzene and crystallized by the gradual addition of about 2 liters of petroleum ether. The crystalline mixture was cooled for 14 hours at 5°. The precipitated crude 2-amino-5,4'-dichlorobenzophenone oxime was dissolved in 900 ml. of boiling benzene and treated with charcoal. The hot mixture was filtered and the α-oxime was crystallized out by the addition of 1 liter of petroleum ether. After crystallization from a mixture of benzene and petroleum ether, the pure 2-amino-5,4'-dichlorobenzophenone α-axime was obtained in the form of colorless prisms, melting at 151–154°.

15 ml. of chloracetyl chloride were added over a period of ½ hour to a 50° solution of 28 g. of 2-amino-5,4'-dichlorobenzophenone α-axime in 250 ml. of glacial acetic acid. The mixture was left at room temperature for 14 hours and then concentrated in vacuo. The residue was dissolved in hot methylene chloride and washed with ice cold sodium hydroxide and water. The organic layer was separated, dried and concentrated in vacuo to about 300 ml. It was then diluted with 600 ml. of petroleum ether and cooled. The reaction product, 6-chloro-2-chloromethyl-4-(4-chlorophenyl)-quinazoline 3-oxide, crystallized in fine yellow needles melting at 163–164°.

27 g. of 6-chloro-2-chloromethyl-4-(4-chlorophenyl)-quinazoline 3-oxide were added in portions at 0° to 150 ml. of a 50% solution of methylamine in methanol. The reaction mixture was stirred at room temperature for 19 hours, then cooled to 5° for 6 hours and filtered. The reaction product remaining on the filter was recrystallized from ethanol to obtain yellow prisms of 7-chloro-2-methylamino-5-(4-chlorophenyl)-3H-1,4-benzodiazepine 4 - oxide melting at 254–255°.

A solution of 3 g. of 7-chloro-2-methylamino-5-(4-chlorophenyl)-3H-1,4-benzodiazepine 4-oxide and 3 ml. of phosphorus trichloride in 50 ml. of chloroform was refluxed for one hour. Methylene chloride, ice and an excess of 50% sodium hydroxide were then added and the mixture was stirred energetically to achieve complete neutralization. The methylene chloride solution was separated, dried and concentrated in vacuo. The crystalline reaction product, 7-chloro-2-methylamino-5-( 4- chlorophenyl)-3H-1,4-benzodiazepine, was recrystallized from a mixture of chloroform and petroleum ether, M.P. 241–242°.

*Example 14*

To 995 g. of p-toluoyl chloride were added in portions at 120°, 500 g. of p-bromaniline, causing a strong evolution of hydrogen chloride. The mixture solidified and was molten by heating to 200°. 500 g. of anhydrous zinc chloride were added, causing again the evolution of hydrogen chloride. The mixture was heated for 2 hours to 230° and then poured with stirring into 2 liters of 0.5 N hydrochloric acid. The precipitated solid was filtered off, pulverized, suspended in 4 liters of 0.5 N hydrochloric acid and refluxed for one hour. The mixture was cooled. The wet resinous material was filtered off and dissolved in a mixture of 1.5 liters of acetic acid and 0.75 liter of concentrated hydrochloric acid. The solution was refluxed for 18 hours and concentrated in vacuo. To the residue were added 3 liters of benzene and an excess of sodium hydroxide. The precipitated p-toluic acid sodium salt was filtered off and the aqueous layer discarded. The benzene layer was washed with 2 N sodium hydroxide and then with an excess of 2 N hydrochloric acid. The benzene layer was dried and concentrated, yielding crude 2-amino-5-bromo-4' - methylbenzophenone. After crystallization from a mixture of benzene and petroleum ether, the product formed yellow plates melting at 105–106°.

A mixture of 50 g. of 2-amino-5-bromo-4'-methylbenzophenone, 28 g. of hydroxylamine hydrochloride and 250 ml. of alcohol was refluxed for 15 hours. The solution was neutralized with aqueous sodium carbonate, diluted with 100 ml. of water and 100 ml. of benzene. The precipitated crystals of 2-amino-5-bromo-4'-methylbenzophenone α-oxime were filtered off. The benzene layer was separated, dried and partly concentrated in vacuo yielding an additional quantity of the product. The mother liquors were diluted with petroleum ether to obtain 2-amino-5-bromo-4'-methyl-benzophenone β-oxime. The α-oxime was crystallized from ether and melted at 204–205°. The β-oxime was crystallized from a mixture of benzene and petroleum ether and melted at 115–116°.

Into a stirred, cooled solution (10–15°) of 9.15 g. of 2-amino-5-bromo-4'-methylbenzophenone α-oxime in 45 ml. of dioxane were introduced in small portions 3 ml. of chloracetyl chloride and an equivalent amount of 3 N sodium hydroxide. The chloracetyl chloride and sodium hydroxide were added alternately at a rate so as to keep the temperature below 15° and the mixture neutral or slightly alkaline. After 30 minutes, the mixture was acidified to pH 5 with acetic acid, diluted with water and extracted with ether. The ether extract was dried, concentrated in vacuo and the oily residue was crystallized by the addition of ether. The product, 2-chloracetamido-5-bromo-4'-methylbenzophenone α-oxime, crystallized from dioxane in the form of colorless prisms melting at 179–180°.

A solution of 3 g. of 2-chloracetamido-5-bromo-4'-methylbenzophenone α-oxime in 25 ml. of boiling acetic anhydride was cooled to 75° and saturated with hydrogen chloride. The mixture was left at room temperature for 30 minutes, heated again for 2 hours at 75°, saturated again with hydrogen chloride and concentrated in vacuo. The residue was crystallized from a mixture of methylene chloride and petroleum ether forming yellow needles of 6-bromo-2-chloromethyl-4-(p-tolyl)-quinazoline 3-oxide, melting at 162–164°.

20 g. of 6-bromo-2-chloromethyl-4-(p-tolyl)-quinazoline 3-oxide were added in portions at 0° to 150 ml. of a 50% solution of methylamine in methanol. The reaction mixture was stirred at room temperature for one hour then cooled to 5° and filtered. The reaction product remaining on the filter, 7-bromo-2-methylamino-5-(p-tolyl)-3H-1,4-benzodiazepine 4-oxide, was recrystallized from ethanol forming yellow prisms melting at 255–256°.

A solution of 2.3 g. of 7-bromo-2-methylamino-5-(p-tolyl)-3H-1,4-benzodiazepine 4-oxide and 3 ml. of phosphorous trichloride in 75 ml. of chloroform was refluxed for one hour. Methylene chloride, ice and an excess of 50% potassium hydroxide were then added. The mixture was stirred energetically to achieve complete neutralization. The methylene chloride solution was separated, dried and concentrated in vacuo. The crystalline residue, 7-bromo-2-methylamino-5-(p-tolyl)-3H-1,4-benzodiazepine, was recrystallized from chloroform, M.P. 258–259°.

We claim:
1. A compound selected from the group consisting of benzodiazepine compounds of the formulas

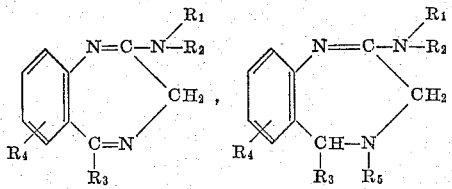

wherein
$R_1$ represents a member of the group consisting of hydrogen and lower alkyl,
$R_2$ represents a member of the group consisting of hydrogen and lower alkanoyl,
$R_3$ represents a member of the group consisting of phenyl, monohalophenyl and mono-lower alkylphenyl,
$R_4$ represents a member of the group consisting of hydrogen, halogen and lower alkyl, and
$R_5$ represents a member of the group consisting of hydrogen, hydroxy, and lower alkanoyloxy, and medicinally acceptable acid addition salts of the basic benzodiazepine compounds.

2. A compound of the formula

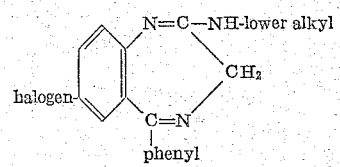

3. A compound of the formula

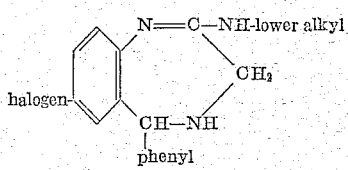

4. A compound of the formula

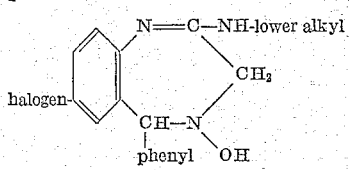

5. 7-chloro-2-(N-methylacetamido)-5-phenyl-3H-1,4-benzodiazepine.

6. 7-chloro-2-methylamino-5-phenyl-4,5-dihydro-3H-1,4-benzodiazepine.

References Cited in the file of this patent

UNITED STATES PATENTS 2,893,992    Sternbach _____ July 7, 1959
3,051,701    Reeder et al. _____ Aug. 28, 1962

OTHER REFERENCES

Sidgwick: Organic Chemistry of Nitrogen, pages 166–67 (1937).

Culvenor: Reviews of Pure and Applied Chemistry, vol. 3, No. 2, pages 83–109 (1953).

Gaylord: Reduction with Complex Metal Hydrides, page 761 (1956).

UNITED STATES PATENT OFFICE
CERTIFICATE OF CORRECTION

Patent No. 3,177,201　　　　　　　　　　　　　April 6, 1965

Earl Reeder et al.

It is hereby certified that error appears in the above numbered patent requiring correction and that the said Letters Patent should read as corrected below.

Column 1, line 56, for "-benzodiazine" read -- -benzodiazepine --; line 63, for "-pehnyl-" read -- -phenyl- --; column 2, lines 23 and 24, for "onticonvulsants" read -- anticonvulsants --; column 5, lines 63 and 67, for "α-axime", each occurrence, read -- α-oxime --.

Signed and sealed this 24th day of August 1965.

(SEAL)
Attest:

ERNEST W. SWIDER　　　　　　　　　　　　EDWARD J. BRENNER
Attesting Officer　　　　　　　　　　　　Commissioner of Patents